United States Patent
Noeller et al.

(10) Patent No.: US 12,159,559 B2
(45) Date of Patent: Dec. 3, 2024

(54) METHOD AND DEVICE FOR PRESENTING APPLIANCE-RELATED INFORMATION, AND HOUSEHOLD APPLIANCE

(71) Applicant: Miele & Cie. KG, Guetersloh (DE)

(72) Inventors: Horst Noeller, Guetersloh (DE); Thorsten Baumgart, Schloss Holte-Stukenbrock (DE)

(73) Assignee: MIELE & CIE. KG, Guetersloh (DE)

( * ) Notice: Subject to any disclaimer, the term of this patent is extended or adjusted under 35 U.S.C. 154(b) by 0 days.

(21) Appl. No.: 18/699,319

(22) PCT Filed: Oct. 5, 2022

(86) PCT No.: PCT/EP2022/077678
§ 371 (c)(1),
(2) Date: Apr. 8, 2024

(87) PCT Pub. No.: WO2023/061821
PCT Pub. Date: Apr. 20, 2023

(65) Prior Publication Data
US 2024/0331591 A1    Oct. 3, 2024

(30) Foreign Application Priority Data
Oct. 12, 2021    (DE) .................... 10 2021 126 374.3

(51) Int. Cl.
*G09G 3/00*    (2006.01)
*G06F 3/01*    (2006.01)

(52) U.S. Cl.
CPC ............ *G09G 3/001* (2013.01); *G06F 3/011* (2013.01)

(58) Field of Classification Search
CPC ................................. G09G 3/001; G06F 3/011
See application file for complete search history.

(56) References Cited

U.S. PATENT DOCUMENTS

| | | | |
|---|---|---|---|
| 2010/0182136 A1* | 7/2010 | Pryor | G06F 3/017 340/425.5 |
| 2017/0328577 A1 | 11/2017 | Reinhard-Herrscher et al. | |
| 2020/0236743 A1* | 7/2020 | Yang | G03B 21/10 |
| 2020/0370755 A1* | 11/2020 | Horst | F24C 3/122 |

FOREIGN PATENT DOCUMENTS

| | | |
|---|---|---|
| CN | 106595173 A | 4/2017 |
| CN | 108759276 A | 11/2018 |
| CN | 110375340 A | 10/2019 |
| DE | 202007008843 U1 | 10/2008 |
| DE | 102009026447 A1 | 12/2010 |
| DE | 102015101174 A1 | 7/2016 |
| DE | 102017207222 A1 | 10/2018 |

* cited by examiner

*Primary Examiner* — Muhammad N Edun
(74) *Attorney, Agent, or Firm* — LEYDIG, VOIT & MAYER, LTD.

(57) ABSTRACT

A method for presenting an item of appliance information of a household appliance that is covered with a panel includes: moving the household appliance from an inactive position to an active position, the active position representing a position, offset with respect to the inactive position, in which the household appliance is offset relative to a surface adjacent to the household appliance; and projecting the appliance information onto the surface in order to visibly present the appliance information.

9 Claims, 3 Drawing Sheets

METHOD AND DEVICE FOR PRESENTING APPLIANCE-RELATED INFORMATION, AND HOUSEHOLD APPLIANCE

CROSS-REFERENCE TO PRIOR APPLICATIONS

This application is a U.S. National Phase application under 35 U.S.C. § 371 of International Application No. PCT/EP2022/077678, filed on Oct. 5, 2022, and claims benefit to German Patent Application No. DE 10 2021 126 374.3, filed on Oct. 12, 2021. The International Application was published in German on Apr. 20, 2023 as WO 2023/061821 A1 under PCT Article 21(2).

FIELD

The invention relates to a method and an apparatus for presenting an item of appliance information, and to a household appliance.

BACKGROUND

Household appliances such as baking ovens or steam cookers can be installed as part of a kitchen concept as a fully integrated appliance covered with a unit front. With such a panel, the corresponding operating state of the appliance cannot be directly seen by a user, as there is no display visible from the outside.

Documents DE 10 2017 207 222 A1 disclose a cooling appliance having a projection device that projects information into the cooling space.

Document DE 10 2015 101 174 A1 describes a cooktop with a cooktop plate and a projector disposed below the cooktop plate which can project information onto a projection surface disposed above the cooktop plate.

Document DE 10 2009 026 447 A1 shows that a projector integrated into a kitchen hood can project information onto a piece of kitchen furniture—in particular, a kitchen countertop.

SUMMARY

In an embodiment, the present invention provides a method for presenting an item of appliance information of a household appliance that is covered with a panel, the method comprising: moving the household appliance from an inactive position to an active position, the active position representing a position, offset with respect to the inactive position, in which the household appliance is offset relative to a surface adjacent to the household appliance; and projecting the appliance information onto the surface in order to visibly present the appliance information.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
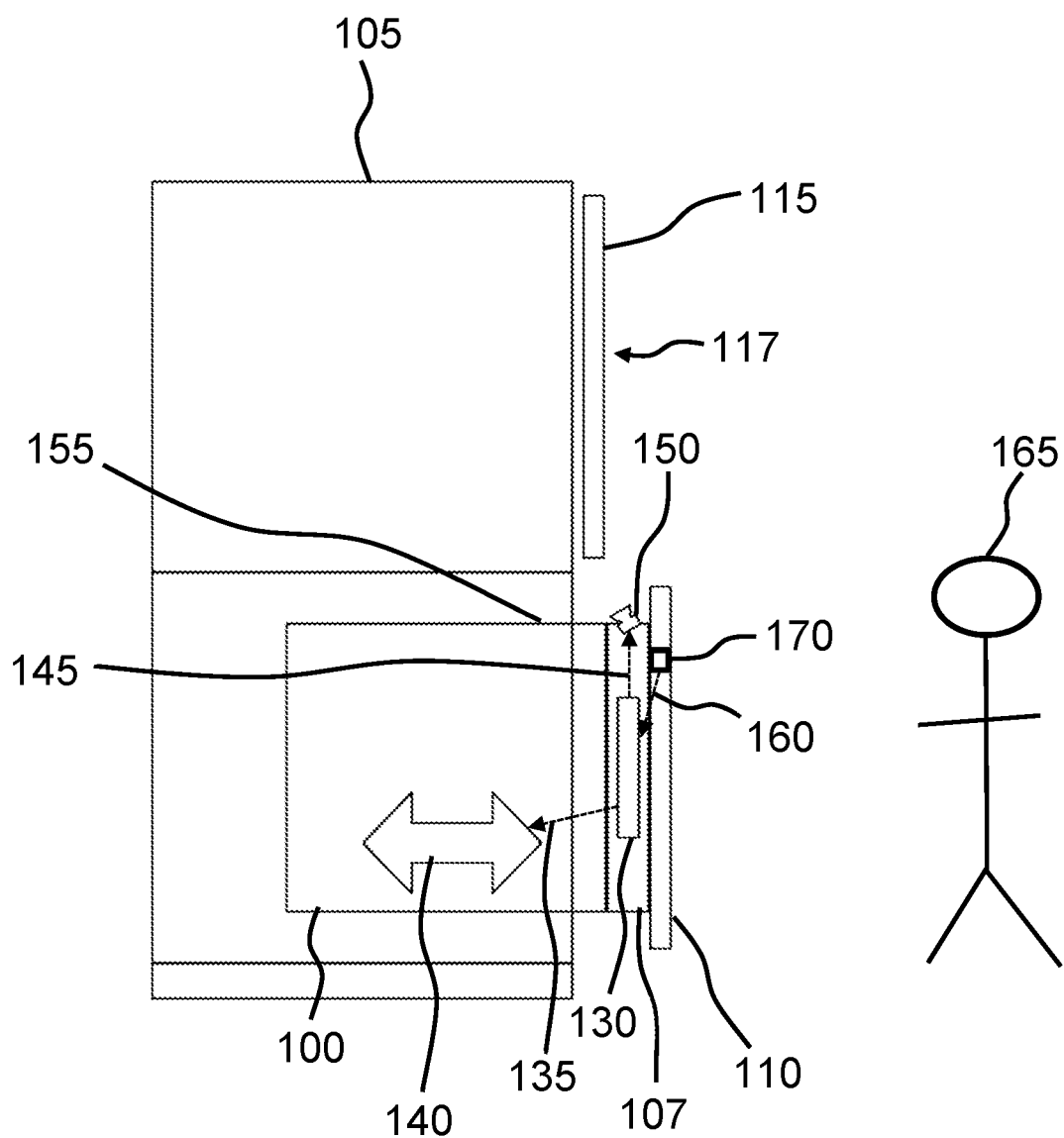
FIG. 1 a schematic side view of a covered household appliance according to an exemplary embodiment.

In an embodiment, the present invention provides an improved method and an improved apparatus for presenting an item of appliance information, and an improved household appliance. Embodiments of the invention provide a method for presenting an item of appliance information, a corresponding apparatus, and a household appliance having the features described herein.

Advantages achievable with the invention include improved visibility of displayed appliance information of a household appliance that is covered with a panel.

A method for presenting an item of appliance information of a household appliance that is covered with a panel is presented. The method comprises a step of moving the household appliance from an inactive position to an active position, wherein the active position represents a position offset to a surface disposed on the household appliance, and a step of projecting the appliance information onto the surface disposed on the household appliance in order to visibly present the appliance information. The household appliance can, for example, be a cooking appliance, a beverage preparation device, or a drawer. For example, the household appliance can be a kitchen appliance that can be installed in a state ready for operation in a kitchen unit. It can thus be an appliance which is fully integrated in the installed state. The household appliance can, for example, be clad, i.e., covered, with a unit front. Since such a panel covers a display of the appliance, e.g., a display for displaying appliance-specific information such as a selected program, the household appliance can be operated in addition or as an alternative to a regular display with the method presented herein. The household appliance can be in the inactive position as long as it is not used. In this position, it can, for example, be disposed as close as possible to a wall of a piece of furniture, e.g., a cabinet wall, wherein the appliance front or the panel of the household appliance can be disposed in one plane with further appliances, which are also fully integrated and covered with a panel, and, additionally or alternatively, cabinets. In the movement step, the household appliance is moved from this inactive position to the active position. The household appliance can, for example, be moved a little, e.g., 2 to 10 cm, forwards, i.e., for example, away from the unit front, which results in a corresponding distance between the panel of the household appliance and further panels of other household appliances. In the movement step, the appliance can thus be moved a little out of a niche in which it is installed. Due to the resulting distance, the appliance information, such as the currently selected program of the household appliance, can be projected (back) onto one of the furniture surfaces disposed on the household appliance, e.g., by means of a projection unit or a projector, in the following projection step. Due to the clearly visible projection, a user can, advantageously, very easily see the respective information also from the distance, without having to open the appliance or the panel for this purpose.

According to one embodiment, in the movement step, a movement signal can be provided to a movement unit for moving the household appliance from the inactive position to the active position. Additionally or alternatively, in the projection step, a projection signal can be provided to a projection unit for projecting the appliance information. For example, the method can be executed on an apparatus designed to read in and, additionally or alternatively, provide signals. This has the advantage that the method can be optimized and can be carried out both in an appliance-specific and a user-specific manner.

According to a further embodiment, the method can comprise a step of reading in an activation signal prior to the projection step. The appliance information can be projected in response to the activation signal. The activation signal can, for example, take place before the movement step—for example, when the household appliance is switched on. Additionally or alternatively, the activation signal can also be read in after the movement step. Advantageously, projection of the appliance information can, as a result, be carried out independently of the movement step.

Moreover, the activation signal can represent an acoustic signal and, additionally or alternatively, an approach of a person and, additionally or alternatively, a predetermined gesture of the person. For example, the activation signal can only then be activated situationally if a user wants to see a current item of appliance information. This has the advantage that energy can be saved.

According to a further embodiment, the method can include a step of detecting a current operating state of the household appliance. In the projection step, the appliance information can represent the detected operating state. For example, projections can provide information about the respective operating state of the appliance, such as information that an appliance is active, current status information, such as remaining program times, prompts, or error or malfunction messages. Advantageously, the information that may be currently relevant to a user of the household appliance can thus be presented.

According to a further embodiment, in the projection step, the appliance information can be projected in the form of plain text and, additionally or alternatively, in the form of an image and, additionally or alternatively, in the form of colored light. For example, in the event of an error message, a warning symbol can be projected, e.g., in red light, and, additionally or alternatively, the error can be readable in the form of plain text. This has the advantage that a type of projection specifically suitable for the current appliance information can be used for various appliance information.

According to a further embodiment, the projection step can be carried out for a predetermined period of time. For example, projection of the appliance information can be carried out during the entire program. Additionally or alternatively, the projection can also be activated only situationally and then carried out for a period of, for example, 2 minutes and, additionally or alternatively, for a period of time in which a person is detected in front of the household appliance. In this case, the desired time period can be defined, for example, individually—for example, when the household appliance is put into operation. Advantageously, a runtime of the method can thereby be optimized and flexibly adapted to the desires of a user.

The approach presented herein furthermore creates an apparatus which is designed to carry out, control, or implement, in corresponding devices, the steps of a variant of a method presented herein. Advantages of the invention can also be achieved quickly and efficiently by this embodiment variant of the invention in the form of an apparatus.

The apparatus can be designed to read in input signals and to determine and provide output signals using the input signals. An input signal can, for example, represent a sensor signal that can be read in via an input interface of the apparatus. An output signal can represent a control signal or a data signal that can be provided at an output interface of the apparatus. The apparatus can be designed to determine the output signals using a processing rule implemented in hardware or software. For example, the apparatus can comprise a logic circuit, an integrated switching circuit, or a software module for this purpose and can, for example, be realized as a discrete component or can be comprised by a discrete component.

In addition, a household appliance with a variant of the apparatus presented above is presented, wherein the household appliance is, or can be, covered with a panel. This combination has the advantage that all of the aforementioned advantages can be optimally realized. As an alternative to being used in a domestic environment, the approach described can also be implemented in connection with a commercial appliance.

According to one embodiment, the apparatus can comprise a projection unit for projecting the appliance information, wherein the projection unit can be disposed on an edge of the household appliance. For example, the projection unit can be disposed on an upper edge when the household appliance is in the installed state, and, after movement, the household appliance can project the appliance information upwards onto a piece of furniture disposed above the household appliance. The arrangement of the projection unit on an edge has the advantage that the distance to be covered by the light beams of the projection unit can be kept as short as possible, which can save energy.

A computer program product or computer program with program code, which can be stored on a machine-readable carrier or storage medium, such as a semiconductor memory, a hard disk memory, or an optical memory, is also advantageous. If the program product or program is executed on a computer or an apparatus, the program product or program can be used to carry out, implement, and/or control the steps of the method according to one of the embodiments described above.

FIG. 1 shows a schematic side view of a covered household appliance 100 according to an exemplary embodiment. In the illustration shown herein, the household appliance 100 is installed, only by way of example, in a lower half of a cabinet 105, wherein, in this exemplary embodiment, an appliance door 107 of the household appliance 105 is covered with a panel 110, which can also be referred to as a unit front. In this exemplary embodiment, the panel 110 is movable together with the appliance door 107—for example, by means of a grip ledge on the door when the appliance door 107 is opened. The upper half of the cabinet 105 is covered with a further panel 115, which in this exemplary embodiment resembles panel 110. The cabinet 105 is formed such that the panel 110 and the further panel 115 are disposed on one plane when the household appliance 100 is in an inactive position. In the illustration shown herein, the household appliance 100 is shown in an active position in which the household appliance 100 is partially moved out of the cabinet 105 and is thus disposed offset to a surface 117 of the further panel 115.

In order to move the household appliance 100 from the inactive position to the active position, the household appliance 100 in this exemplary embodiment comprises an apparatus 130 which is configured, only by way of example, so as to provide a movement signal 135 to a movement unit 140 for moving the household appliance 100. The movement unit 140 comprises, for example, an electric motor controllable by the movement signal 135 and a mechanism coupled to the electric motor for moving the household appliance 100. For example, the movement unit 140 is designed to move the entire household appliance 100 from the inactive position to the active position, and vice versa.

For example, when moved between the two positions, the household appliance 100 is moved a few centimeters, e.g., less than 10 centimeters, along a movement path oriented orthogonally to the surface 117.

The apparatus 130 is furthermore designed to provide a projection signal 145 to a projection unit 150. The projection unit 150, which can also be referred to as a projector, is disposed, only by way of example, on an upper edge 155 of the appliance door 107. In this exemplary embodiment, the upper edge 155 corresponds to an edge of the household appliance 100 which is closest to the further panel 115. Using the projection signal 145, the projection unit 150 is designed to project an item of appliance information onto the surface 117 of the further panel 115. For example, the projection unit 150 comprises at least one light source for this purpose.

In this exemplary embodiment, the projection signal 145 is provided, only by way of example, in response to an activation signal 160. In this exemplary embodiment, the activation signal 160 represents an approach of a person 165 which, only by way of example, can be detected by means of a movement sensor 170. The apparatus 130 is designed here, only by way of example, to read in the activation signal 160 provided by the movement sensor 170 in this exemplary embodiment and, consequently, to provide the projection signal 145.

In another exemplary embodiment, the activation signal can also be provided, for example, by manual actuation of a button, by a gesture, or by voice control.

For example, the household appliance 100 is designed as an oven, an oven with a microwave, a steam oven, a steam cooker with or without a microwave, a Dialog oven, a fully automatic coffee machine, or a drawer.

Figure 2:
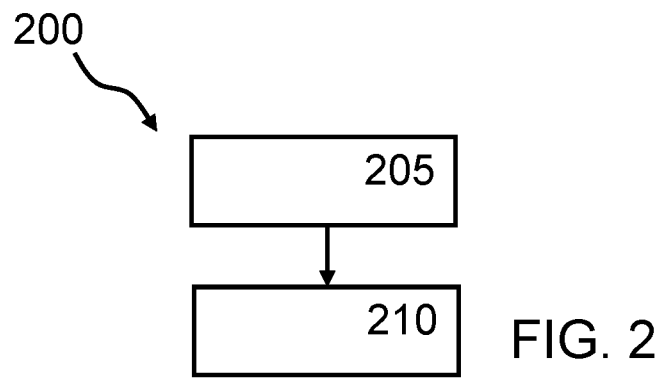
FIG. 2 a flowchart of an exemplary embodiment of a method for presenting an item of appliance information of a covered household appliance.

FIG. 2 shows a flowchart of an exemplary embodiment of a method 200 for presenting an item of appliance information of a covered household appliance. The method 200 shown here can be carried out, by way of example, for a household appliance, as has been described in the preceding figure. The method 200 comprises a step 205 of moving the household appliance from an inactive position to an active position, wherein the active position represents a position offset with respect to a surface adjacent to the household appliance. In this case, only by way of example, the appliance is moved out a little from a niche of a built-in kitchen unit during operation.

A surface disposed on the household appliance or adjacent to the household appliance is, for example, an element of a piece of kitchen furniture such as the door of an adjacent cabinet or a countertop.

The method 200 further comprises a step 210 of projecting the appliance information onto the surface disposed on the household appliance in order to visibly present the appliance information. The appliance information is projected onto a furniture surface of another household appliance using, only by way of example, a projection unit. The appliance information is, only by way of example, information about the active state of the household appliance and, only by way of example, the remaining time of a selected program. In this exemplary embodiment, the appliance information is carried out in the form of a plain text and, only by way of example, for a predetermined period of time, wherein the time period in this exemplary embodiment corresponds to the time period of the selected program.

In another exemplary embodiment, the appliance information can, additionally or alternatively, comprise further current status information relating to the selected program, as well as prompts or error or malfunction messages. Moreover, the appliance information can optionally be projected in the form of images or symbols and, additionally or alternatively, in the form of colored light, and the projection can take place situationally when the appliance is active—for example, when a person is approaching or addressing the appliance or making a gesture.

Figure 3:
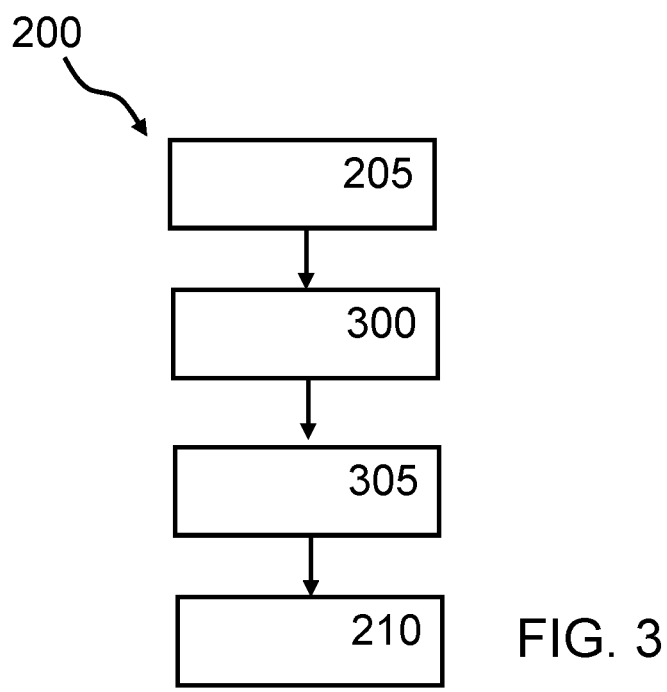
FIG. 3 a flowchart of an exemplary embodiment of a method for presenting an item of appliance information of a covered household appliance.

FIG. 3 shows a flowchart of an exemplary embodiment of a method 200 for presenting an item of appliance information of a household appliance that is covered with a panel. The method 200 shown here corresponds or resembles the method described in the preceding FIG. 2, with the difference that it includes additional steps. In this exemplary embodiment, the movement step 205 is followed by a step 300 of reading in an activation signal. The activation signal represents, only by way of example, a voice input of a person, wherein, in this exemplary embodiment, the appliance information is projected in response to the activation signal. In another exemplary embodiment, the reading step can also take place before the movement step. The activation signal can, only by way of example, represent a manual input, wherein both moving the household appliance and projecting the appliance information can take place in response to the activation signal.

In this exemplary embodiment, the reading step 300 is followed by a step 305 of detecting a current operating state of the household appliance. Current status messages, prompts, and malfunctions are detected, only by way of example, as current appliance information, and, in the subsequent projection step 210, the corresponding appliance information is projected, only by way of example, for a predetermined period of, for example, two minutes onto the surface disposed on the household appliance.

Figure 4:
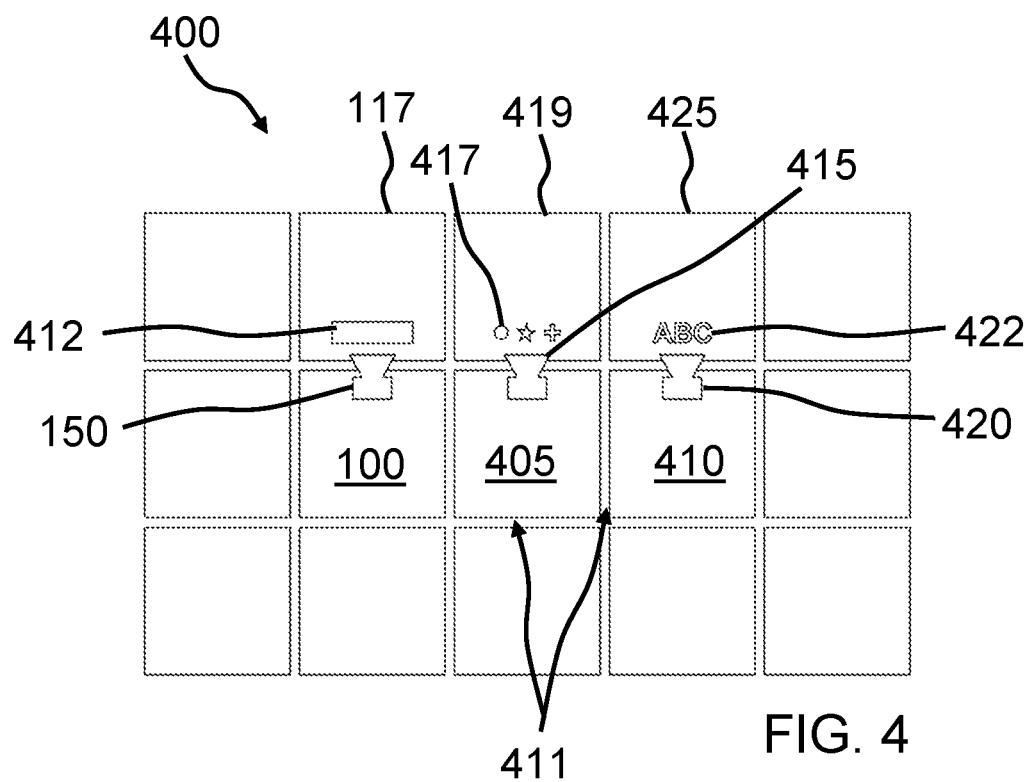
FIG. 4 a schematic front view of a kitchen unit with covered household appliances according to an exemplary embodiment.

FIG. 4 shows a schematic front view of a kitchen unit 400 with covered household appliances 100, 405, 410 according to an exemplary embodiment. The household appliance 100 shown here corresponds to or resembles the household appliance described in the preceding FIG. 1. In this exemplary embodiment, a further household appliance 405 and an additional household appliance 410 are disposed next to the household appliance 100. In this exemplary embodiment, all three household appliances 100, 405, 410 that are part of the kitchen unit 400 are covered with a panel and can be controlled using a method as described in the preceding FIGS. 2 and 3. In this exemplary embodiment, instead of being directly adjacent to one another, the covered household appliances 100, 405, 410, which can also be referred to as Vi appliances, have a gap 411 with respect to one another, as well as to adjacent unit fronts, between which gap the household appliances 100, 405, 410 are disposed. The household appliance 100 comprises a projection unit 150, which is designed in this exemplary embodiment to output an item of appliance information 412 as light in different colors and to project it onto an adjacent surface 117. Similarly, the further household appliance 405 comprises a further projection unit 415, which is designed, only by way of example, to output a further item of appliance information 417 in the form of images and symbols and to project it onto a further adjacent surface 419. The additional household appliance 410 moreover comprises an additional projection unit 420, which is designed, only by way of example, to output an additional item of appliance information 422 as plain text and to project it onto an additional adjacent surface 425. In another exemplary embodiment, the household appliances can also be designed as built-in appliances of a cabinet wall or shelf and be covered with corresponding unit fronts.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for presenting an item of appliance information of a household appliance that is covered with a panel, the method comprising:
    moving the household appliance from an inactive position to an active position, wherein the active position represents a position, offset with respect to the inactive position, in which the household appliance is offset relative to a surface adjacent to the household appliance;
    projecting the appliance information onto the surface in order to visibly present the appliance information; and
    reading in an activation signal before the projecting,
    wherein the appliance information is projected in response to the activation signal, and
    wherein the activation signal represents an acoustic signal and/or an approach of a person and/or a predetermined gesture of the person.

2. The method of claim 1, wherein, during the moving, a movement signal is provided to a movement unit for moving the household appliance from the inactive position to the active position, and/or
    wherein, during the projecting, a projection signal is provided to a projection unit for projecting the appliance information.

3. The method of claim 1, further comprising:
    detecting a current operating state of the household,
    wherein, during the projecting, the appliance information represents the detected operating state.

4. The method of claim 1, wherein, during projecting, the appliance information is projected in a form of plain text and/or in a form of an image and/or in a form of colored light.

5. The method of claim 1, wherein the projecting is carried out for a predetermined period of time.

6. An apparatus configured to carry out the method of claim 1 in corresponding units.

7. A household appliance, comprising:
    the apparatus of claim 6,
    wherein the household appliance is, or can be, covered with a panel.

8. The household appliance of claim 7, wherein the apparatus comprises a projection unit configured to project the appliance information, and
    wherein the projection unit is disposed on an edge of the household appliance.

9. A non-transitory computer-readable medium having processor-executable instructions stored thereon, wherein the processor-executable instructions, when executed by one or more processors, facilitate performance of the method of claim 1.

* * * * *